US006941823B1

(12) United States Patent
Lai et al.

(10) Patent No.: US 6,941,823 B1
(45) Date of Patent: Sep. 13, 2005

(54) APPARATUS AND METHOD TO COMPENSATE FOR STRESS IN A MICROCANTILEVER

(75) Inventors: Jonathan W. Lai, Goleta, CA (US); Hector B. Cavazos, Santa Barbara, CA (US); Stephen C. Minne, Danville, IL (US); Dennis M. Adderton, Santa Barbara, CA (US)

(73) Assignee: Veeco Instruments Inc., Woodbury, NY (US)

( * ) Notice: Subject to any disclaimer, the term of this patent is extended or adjusted under 35 U.S.C. 154(b) by 314 days.

(21) Appl. No.: 10/045,438

(22) Filed: Nov. 7, 2001

(51) Int. Cl.$^7$ .............................................. G01L 1/04
(52) U.S. Cl. ........................... 73/862.639; 73/862.634
(58) Field of Search .................... 73/862.634–862.639, 73/800–812, 165, 760, 786, 795, 104, 105

(56) References Cited

U.S. PATENT DOCUMENTS

| | | | | |
|---|---|---|---|---|
| 5,189,918 A | * | 3/1993 | Etienne et al. | 73/561.75 |
| 5,386,442 A | * | 1/1995 | Diaz et al. | 376/245 |
| 5,468,959 A | * | 11/1995 | Tohda et al. | 250/306 |
| 5,475,318 A | * | 12/1995 | Marcus et al. | 324/762 |
| 5,517,280 A | * | 5/1996 | Quate | 355/71 |
| 5,723,775 A | * | 3/1998 | Watanabe et al. | 73/105 |
| 5,898,106 A | * | 4/1999 | Babcock et al. | 73/105 |
| 5,986,262 A | * | 11/1999 | Volcker | 250/306 |
| 6,025,719 A | * | 2/2000 | Anderson | 324/318 |
| 6,189,374 B1 | * | 2/2001 | Adderton et al. | 73/105 |
| 6,389,886 B2 | * | 5/2002 | Daniels et al. | 73/105 |
| 6,509,969 B1 | * | 1/2003 | Takeshita et al. | 356/399 |
| 6,604,395 B2 | * | 8/2003 | Lee | 72/37 |
| 6,664,540 B2 | * | 12/2003 | Shimizu et al. | 250/309 |

OTHER PUBLICATIONS

Article entitled "A New Technique For Producing Large-Area As-Deposited Zero-Stress LPCVD Polysilicon Films: The MultiPoly Process," by Jie Yang et al., from IEEE Journal of Microelectronmechanical Systems, vol. 9, No. 4, Dec. 2000.

* cited by examiner

Primary Examiner—M. No
Assistant Examiner—Alandra Ellington
(74) Attorney, Agent, or Firm—Boyle Fredrickson Newholm Stein & Gratz S.C.

(57) ABSTRACT

A method to compensate for stress deflection in a compound microprobe that includes a substrate, a microcantilever extending outwardly from the substrate, and a film formed on the microcantilever. The method preferably comprises the steps of determining an amount of stress-induced deflection of the microcantilever, and then mounting the microprobe so as to compensate for the stress-induced deflection. The mounting step preferably includes selecting a compensation piece based upon the amount of stress-induced deflection, where the compensation piece is a wedge generally aligning the microcantilever with a deflection detection apparatus. In general, the step of selecting the compensation piece includes correcting an angle between a longitudinal axis of the microcantilever and the substrate so as to insure that light reflected from the microcantilever during operation contacts a detector of a deflection detection apparatus. The preferred embodiment is also directed to a microprobe assembly having a microcantilever and a substrate coupled to a support that includes a compensation piece disposed intermediate the support and the substrate. Again, the compensation piece is configured to compensate for an amount of static deflection of the microcantilever.

30 Claims, 6 Drawing Sheets

APPARATUS AND METHOD TO COMPENSATE FOR STRESS IN A MICROCANTILEVER

BACKGROUND OF THE INVENTION

1. Field of the Invention

The present invention relates to Atomic Force Microscopy (AFM) and other nanotechnology apparatus using microcantilevers as force sensors. More particularly, the invention relates to an apparatus and method for measuring the deflection of a microcantilever due to stress and to compensate for this stress in the microcantilever.

2. Description of the Related Art

For many applications, a microcantilever is the most sensitive force detector available in industry. In recent years, advances in micro-electromechanical device (MEMS) manufacturing techniques have made the microcantilever a mass producible device. The availability of these devices has enabled the widespread use of scanning probe microscopes, such as the atomic force microscope (AFM), across many industries. For example, microcantilevers are now being exploited as sensors for airborne reagents, as well as reagents in solution.

Microcantilevers are simply small beams ranging in length from a few millimeters down to a few microns. They are typically batch fabricated by microstructure processing (MSP) from semiconductor wafers. More particularly, bulk processing of silicon and surface processing are used to produce silicon microcantilevers and silicon nitride or polysilicon cantilevers.

Microcantilevers can have the shape of a simple beam extending from a larger support member, or they can have a more complex shape. Many AFM microcantilevers have a two-beam geometry and form a V-shape with the apex at the distal end where a probe tip is mounted. Another geometry of AFM microcantilevers comprises a diffraction grating, where more than one microcantilever has finer finger elements that are interleaved with fingers of another microcantilever to form an optical grating structure.

The above-mentioned microcantilevers function like a force sensor, similar to a small spring. An applied force is measured generally linearly as the microcantilever is deflected. Alternatively, it is useful to use the resonant response of the microcantilever to measure the applied force as a function of a change in the natural frequency of the microcantilever or, for example, as a function of a change in the quality factor of the natural resonance of the microcantilever when the microcantilever touches a surface. Measuring the change in the microcantilever resonance is a useful mechanism for detecting a change in the force on the microcantilever.

As the applied force causes a deflection of the microcantilever sensor, it becomes necessary to measure the microcantilever deflection with great precision. Among the deflection detection schemes that have proved satisfactory are optical beam bounce, laser and white light interferometry, laser diode feedback, capacitance C measurement, tunneling current measurement, polarization detection, interdigital diffraction grating techniques, and piezoresistance measurement. Each of these detection schemes, with the exception of piezoresistance, requires that the microcantilever be aligned with, or placed in proximity to the deflection detection device. For example, optical beam bounce is an optical based system that typically includes a laser and a photodetector which interact with the microcantilever to measure deflection of the cantilever. A position-sensitive detector (PSD) receives a reflected beam and generates a signal indicative of the beam's changing position on the detector, as described in further detail below. In addition to its high sensitivity, this scheme has proven to be well suited for measurements in an ultra-high vacuum (UHV) environment.

Another detection scheme uses laser and white light interferometry, in which a laser beam is reflected off the microcantilever and a photodetector is used to sense the angular movement of the beam as the microcantilever is deflected. Still another way of measuring microcantilever deflection is using a tunneling current detector. Tunneling occurs between an auxiliary conducting tip and the microcantilever, which are separated by several angstroms. The application of a bias voltage produces a tunneling current through the air gap separating the microcantilever and the tunneling tip from one another by modulating the tunneling current, it is possible to detect deflections of the microcantilever as small as $10^{-4}$ angstroms. Notably, deflection of the microcantilever will vary the gap between the tunneling tip and the microcantilever and produce a change in the tunneling current.

Minute deflections of a microcantilever can also be monitored by a change in capacitance between the microcantilever and a reference plate. A high-Q resonant circuit is employed to measure the changes in capacitance. On the slope of the electronic resonance of the circuit, small resonance frequency variations caused by deflection of the microcantilever result in an amplitude change in the electronic resonance. This amplitude change provides a very sensitive measure of the microcantilever deflection.

In a basic homodyne microcantilever deflection system, a polarized laser beam passes through a beam splitter and is incident on a Fabry-Perot etalon whose reflecting surfaces consist of an optical flat and the microcantilever. The beam, which is reflected back from the etalon is incident on the same beam splitter and is deflected into a photodetector. The photodetector then generates a photocurrent used to measure the deflection of the microcantilever.

In a differential homodyne microcantilever deflection system, a fraction of the laser beam (serving as a reference beam) is diverted by a beam splitter to a first photodetector. The light passing through the beam splitter (serving as a signal beam) is incident on the Fabry-Perot etalon, reflected back, and deflected towards a second photodetector. Next, the currents of the two photodetectors are compared, and their difference yields a signal that is used to measure the deflection of the microcantilever. Homodyne detection may also be implemented using a fiber-coupled laser.

In a heterodyne detection system, a first beam splitter divides a laser beam into two beam components. One beam component is passed through an acousto-optic modulator that shifts the beam frequency by some amount (omega) and the other beam component is reflected onto a mirror as a reference beam. The beam with the shifted frequency, which serves as the signal beam, passes through a polarizing beam splitter, a quarter-wave plate, and finally through a lens that focuses it onto the microcantilever. The microcantilever reflects the beam back through the lens and quarter-wave plate, which rotates the polarization of the beam on the two passes by 90 degrees. The polarizing beam splitter then reflects the beam incident on the photodetector. The reference and signal beams interfere on the photodetector, which generates a current consisting of a spectrum of frequencies. The photocurrent is then fed into a single side-band receiver driving a phase-sensitive detector that provides a signal representative of the microcantilever deflection.

The sensitivity of solid-state lasers to optical feedback is often used in AFMs as a detection means for microcantilever deflection. Under certain optical feedback conditions, the operation of the laser can become noisy, bi-stable, or chaotic. A microcantilever positioned several microns in front of the laser output can induce variations in this optical feedback. The lever and front facet combination act as a lossy Fabry-Perot etalon, whose reflectivity serves as the effective reflectivity of the front facet of the laser. The optical losses are the result of the diffraction effects where successive reflections between the front facet and the lever decrease for higher orders. This system is simple to assemble from a few components. However, the system's sensitivity relies greatly on the precise positioning of the microcantilever with respect to the front facet of the laser.

A polarization detection system differs from other optical detection systems in that the measured deflection of the microcantilever sensor is first converted into a polarization signal prior to being converted into an amplitude signal. The conversion from a polarization signal to an amplitude signal is accomplished with two polarizing prisms rotated forty-five degrees relative to each other that produce an interference between s- and p-polarized fields. The output from this differential system has a common-mode rejection that cancels laser noise. This output is used to measure the deflection of the microcantilever.

Another microcantilever deflection detection system becoming more widely used is an interdigital diffraction grating disposed on the microcantilever. Fingers protrude from the microcantilever either perpendicularly or longitudinally. These fingers are interleaved with fingers protruding from either (1) another proximal microcantilever, or (2) the microcantilever substrate. The interleaving fingers form a grating structure whose spacing changes when the microcantilever is deflected. A laser beam incident on the grating structure produces an interference pattern on a photodiode positioned to collect laser light reflected from the grating structure.

As with each of the previously described systems, the positioning of the grating structure with respect to the laser and photodiode is critical to the sensitivity of the system. Moreover, the output of the photodetector varies sinusoidally with the deflection of the microcantilever. Correct positioning of the microcantilever may require that the phase of the sinusoidal output be positioned at a predetermined value.

The optical beam-bounce deflection detection system is the most commonly used system in AFM for microcantilever deflection detection. A collimated laser beam is focused on the microcantilever and is reflected back towards two closely spaced photodetectors (e.g., bi-cell) whose photocurrents are fed into a differential amplifier. A minute deflection of the microcantilever causes one photodetector to detect more light than the other, and the output of the differential amplifier is directly proportional to the deflection of the microcantilever. This system requires precise angular as well as positional alignment of the microcantilever with respect to the incident laser beam such that the reflected beam is directed precisely to the junction between the two photodetectors.

As the use of microcantilevers becomes more widespread, compound microcantilever structures are becoming commonplace. For example, microcantilevers are often fabricated in multilayer structures to cause bimorphic deflection bending of the microcantilever in response to a stimulus. Unfortunately, compound microcantilevers further complicate ensuring proper alignment within the corresponding detection scheme.

In particular, during process, layers of specialized materials are often coated onto the surface of the microcantilever. The most common microcantilever coating is an aluminum or gold coating on one side of the AFM microcantilever to increase optical reflectivity for the purpose of beam bounce deflection detection. In another example, magnetic force imaging with an AFM is accomplished by coating the tip side of the AFM microcantilever with a ferromagnetic metal that will render the cantilever sensitive to a force in the proximity of a magnetic field. Metal coatings are also used to prepare the microcantilever surface for biochemical reactions, or for absorption of mercury vapor or other reagents. Polymeric coatings are being developed for the purpose of detecting the presence of reagents through absorption. When the polymer absorbs the target, it typically swells, increasing the mass of the microcantilever or bending it due to increased stress.

Overall, these coatings are controlled to minimize the surface stress on the microcantilever. Nevertheless, surface stress still often causes undesirable bending. It is difficult to control the stress in these coatings, so typically the opposite side of the microcantilever is coated in the exact same manner to attempt to compensate for the stress induced bending. However, in addition to being a wasteful process, coating both sides of the lever produces only marginal results in compensating for coating stress.

The present invention is directed to compensating for stress, such as coating stress, and is described in the context of a multi-layer microcantilever structure known as a compound piezoelectric microcantilever. This recent advance in AFM has enabled a factor of ten-fold speed increase in image acquisition and is described in detail in U.S. Pat. No. 6,189,374 issued to the assignee of the present invention. Most generally, the cantilever described herein is a microcantilever with an integrated piezoelectric layer. The piezoelectric material, preferably zinc oxide (ZnO) or lead zirconium titanate (PZT) is disposed on the microcantilever between two metal electrodes. An applied voltage across the electrodes causes an expansion or a contraction of the piezoelectric layer, which causes a stress in the microcantilever. This stress, in turn causes a bending motion of the microcantilever in which the distal end moves through a small arc. The movement of such a microcantilever for AFM allows following the topography of the sample under investigation with a much higher bandwidth than was previously available.

A common problem in all microprobe structures having such a microactuator is the manifestation of interlayer stress inducing static bending of the microcantilever. For many of the above examples, the deflection or bending of the microcantilever is the desired result of the measurement; however, this deflection typically is small enough to remain within the sensitive range of, for example, the detector. The problem of stress arises in the manufacturing of the multi-layer microcantilevers when the deflection due to stress is large enough to move the microcantilever outside the sensitive range of the deflection detection system.

Until now, stress deflection of the microcantilever has been tolerated in the R&D environment by time-consuming adjustment of an AFM apparatus. However, it is no longer acceptable in a commercial market to adjust the apparatus to accommodate poor manufacturing control of the microcantilever sensor. Most often, stress cannot be entirely overcome by engineering or manufacturing control, or by coating both sides of the cantilever, as described previously. As a result, the process is considered low yield and a significant volume of product is discarded as unusable.

In view of the above-described problems relating to stress deflection in compound microcantilevers, the art of microcantilever fabrication was in need of an apparatus and method for, among other things, overcoming the problem of static bending in microcantilevers, especially in the case of volume production.

SUMMARY OF THE INVENTION

The present invention provides a method to accommodate the stress deflection of microcantilevers. The method compensates for manufacturing variability of the microcantilever by correcting the position or angle of the microcantilever and bringing it into a range acceptable for the intended deflection scheme. The method is also a multi-step process in which an amount of stress in a microcantilever device is measured and subsequently compensated. Compensation of the stress includes a combination of a microcantilever support piece and a second mounting piece that serves as a reference to which the stress is compensated. In manufacturing, it is common to mount the microcantilever substrate to a second support piece. Heretofore, stress compensation has not played a role in this mounting process. In previous cases when microcantilever stress has been quantified, the result has been used to accept or reject the product under inspection and no attempt was made to compensate for the stress deflection. This accept/reject process of microcantilever production has placed the bulk of the engineering effort on the control of stress in the process. The present invention redirects the engineering from controlling the stress or the microactuator and towards streamlining the compensation process, so that the process is economically feasible for high throughput production.

Accordingly, one aspect of the preferred embodiment includes a method to compensate for stress deflection in a compound microprobe that includes a substrate, a microcantilever extending outwardly from the substrate, and a film formed on the microcantilever. The method preferably comprises the steps of determining an amount of stress-induced deflection of the microcantilever, and then mounting the microprobe so as to compensate for the stress-induced deflection.

According to another aspect of the preferred embodiment, the mounting step includes selecting a compensation piece based upon the amount of stress-induced deflection. Preferably, the compensation piece is a wedge generally aligning the microcantilever with a deflection detection apparatus. Moreover, the step of selecting the compensation piece includes correcting an angle between a longitudinal axis of the microcantilever and the substrate so as to insure that light reflected from the microcantilever during operation contacts a detector of a deflection detection apparatus.

According to yet another aspect of the preferred embodiment, a compound microprobe assembly having a microcantilever and a substrate coupled to a support includes a compensation piece disposed intermediate the support and the substrate. The compensation piece is configured to compensate for an amount of static deflection of the microcantilever.

Moreover, the compensation piece is preferably a wedge-shaped structure having a mounting surface and a base. And, an angle between the mounting surface and the base is selected based on the static deflection so as to align the microcantilever to a deflection detection apparatus of an AFM in which the assembly is employed.

In another aspect of the preferred embodiment, a method of compensating an amount of static deflection associated with at least one microprobe of a first planar array of microprobes is defined. Each microprobe of the array includes a substrate, a microcantilever extending outwardly from the substrate, and a film formed on the microcantilever. The method includes the steps of directing a beam of light towards a first microprobe of the first array of microprobes, and then reflecting the beam off the microcantilever of the first microprobe. Next, the method includes determining a first amount of static deflection based on the reflected beam, and then selecting a first microprobe compensation piece based upon the first amount of deflection. Thereafter, the method includes mounting the first microprobe on the first selected microprobe compensation piece.

According to a further aspect of this embodiment, the method includes the step of repeating the directing, reflecting, determining and selecting steps for each of the microprobes of the first array of microprobes, and then mounting each of the microprobes on a corresponding compensation piece having a shape selected according to a corresponding amount of static deflection.

In yet another aspect of the preferred embodiment, the method further includes the steps of mounting the first array of microprobes on an X-Y translating stage configured to translate in a plane parallel to the first array prior to said directing step, and removing the first array from the X-Y translating stage. In addition, the method includes translating the stage to a first position in which the first microprobe of the first array of microprobes is disposed in an optical path defined by the beam, wherein the translating step is performed prior to said directing step. Thereafter, after said selecting step, the method includes moving the stage to a second position in which a second microprobe of the first array of microprobes is disposed in the optical path, and then reflecting the beam off a microcantilever of the second microprobe. A second amount of deflection of the beam indicative of an amount of static deflection of the microcantilever of the second microprobe is then determined, and a second microprobe compensation piece is selected based upon the second amount of deflection. Finally, before mounting, the steps of moving, directing, reflecting, determining and selecting are repeated for each microprobe of the first array of microprobes.

According to another aspect of the preferred embodiment, a compound microprobe assembly includes a microprobe mount, and a microprobe coupled to the microprobe mount. The microprobe has a certain amount of static stress-induced deflection and the microprobe mount is configured to compensate for this static deflection. Further, the microprobe mount includes a support and a compensation piece having a shape corresponding to the amount of static deflection. Notably, the compensation piece preferably is a wedge generally aligning the microprobe with a deflection detection apparatus.

These and other objects, features, and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which.

DETAILED DESCRIPTION OF THE PREFERRED EMBODIMENTS

Figure 1:
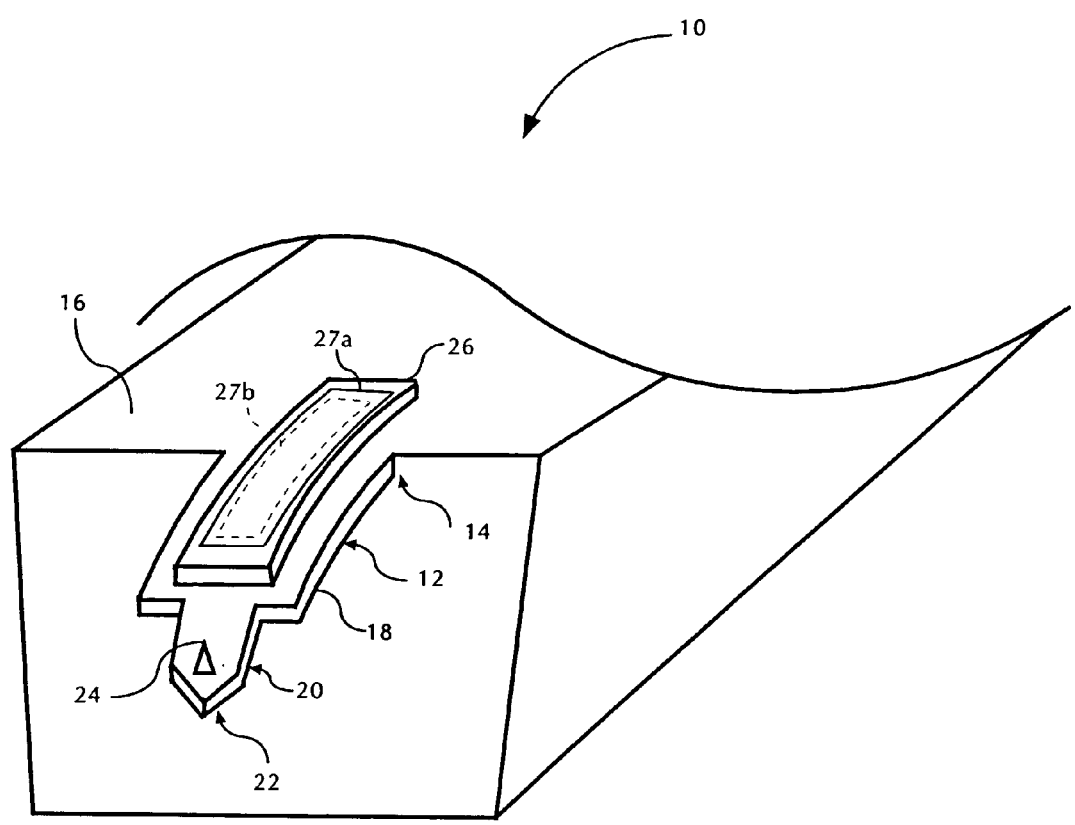
FIG. 1 is a perspective view of a compound microprobe including a microcantilever extending from a substrate.

FIG. 1 shows a portion of a standard Atomic Force Microscope (AFM) including a compound microprobe 10. The microprobe 10 includes a first microcantilever portion 12 having a first end 14 that preferably extends integrally from an AFM substrate 16, and includes an elongated portion 18. It also includes a second microcantilever portion 20 having a distal end 22 that extends from the first microcantilever portion 12 and has, preferably, a sharp tip 24 for scanning the surface of a sample (not shown). The second microcantilever portion 20 functions as a force sensor with a greater sensitivity than the first microcantilever portion 12. The substrate 16 is mounted on a mounting base 32 (see FIG. 2).

The first microcantilever portion 12 includes a piezoelectric layer 26 that is bounded on its top and bottom surfaces by two electrodes 27a and 27b. When a voltage is applied across the electrodes 27a and 27b, it causes the piezoelectric layer 26 to either expand or contract. The expansion or contraction of the piezoelectric layer, in turn, bends the elongated portion 18. The bending motion from this actuation typically deflects microcantilever portion 12 by a few microns and this is sufficient displacement for use as an actuator in a standard AFM, as shown in the aforementioned U.S. Pat. No. 6,189,374. Typically, this actuator is used to maintain AFM operation at a predetermined setpoint as the microprobe 10 scans the surface of a sample.

There are numerous techniques known in the art to manufacture microcantilever portions 12 and 20. In brief, a hole may be bored in a silicon wafer by etching, and a film formed on the wafer and patterned in the form of a microcantilever. The sharp pyramidal tip 24 of the resulting microcantilever is substantially in the shape of an elongated, pyramidal cone having a very narrow point angle. Notably, the standard AFM measurement using microprobe 10 having sharp pyramidal tip 24 can more accurately determine and reproduce the shape of the surface of the sample.

Figure 2:
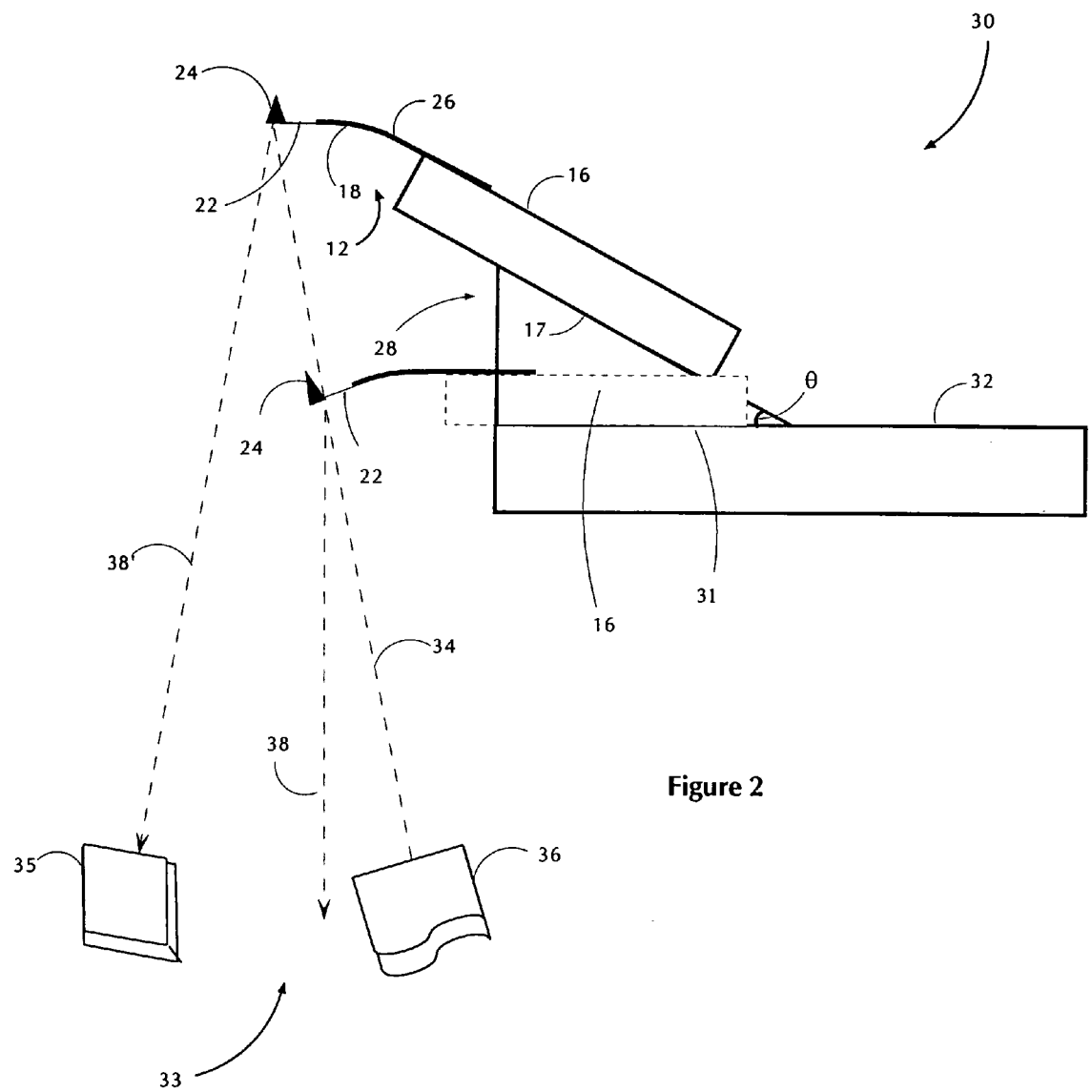
FIG. 2 is a side elevational view of a microprobe, such as that shown in FIG. 1, depicting a wedge compensation piece used to compensate for stress-induced deflection, according to a preferred embodiment of the invention.

Referring to FIG. 2, microprobes for use in the AFM must be positioned with respect to the sample surface such that sufficient clearance from microcantilever substrate 16 to the sample surface (not shown) is achieved. The mounting is also critical to alignment of the laser in optical (e.g., beam-bounce) detection systems. Again, in optical beam-bounce systems an incident laser beam must be directed to a photodetector by reflecting off the microcantilever. This requires high precision in this prescribed positioning. Moreover, some commercial AFMs require that the consumable microcantilevers be supplied attached to a disposable mount, thus further complicating the positioning process. For compound microprobes, which may respond differently to the films disposed thereon, this is particularly problematic because there is no way to efficiently compensate for film-induced stress for each individual microcantilever.

To the contrary, in the preferred embodiment, incorporating a correcting angle in the consumable microcantilever assembly allows this relative positioning to be optimized for each individual microcantilever. As a result, microcantilever yield is maximized in an efficient manner.

In FIG. 2, a microprobe assembly 30 includes a mounting base 32 configured to interface compound microprobe 10 to a metrology apparatus, i.e., an AFM for example, which incorporates a deflection detection apparatus 33. The apparatus 30 retains the mounting base 32 with sufficient indexing accuracy to align microprobe 10 with detection apparatus 33. Since microprobe 10 may have an associated size in the atomic order, the mounting base 32 is selected from a material having a small coefficient of thermal expansion, as well as high rigidity. In this regard, the mounting base 32 for the microprobe may be formed of, for example, glass, ceramic, plastic, metal, or a silicon wafer.

Next, an angle compensation piece 28, which is preferably a wedge-shaped structure, couples base 32 to substrate 16. The mounting base 32 and the substrate 16 may be bonded to wedge 28 by means of an adhesive agent or by an anodic bonding method in which voltage is applied to the two members at high temperature after the bonding surfaces are cleared of soil. Note that the present invention is not, however, limited to these bonding methods and other known bonding methods are contemplated. Moreover, in some cases it may be preferable to combine the wedge shaped piece 28 and the mounting base 32 into one monolithic piece to, for example, save time and cost in manufacturing.

Compensation piece 28 has an angle θ that is chosen to align the microprobe 10 with the deflection detection apparatus 33 so as to compensate for any stress deflection of the microprobe 10, in particular the microcantilever 12. Generally, during the assembly process, several pre-manufactured choices of wedge angle will be available such that the correct one may be chosen to compensate for the static microcantilever stress deflection. The angle may be one of inclination or declination, depending on each of the deflection detection scheme, the apparatus 30 and the amount of stress, for example, on the microcantilever 12 caused by films disposed thereon, for example.

Figure 3:
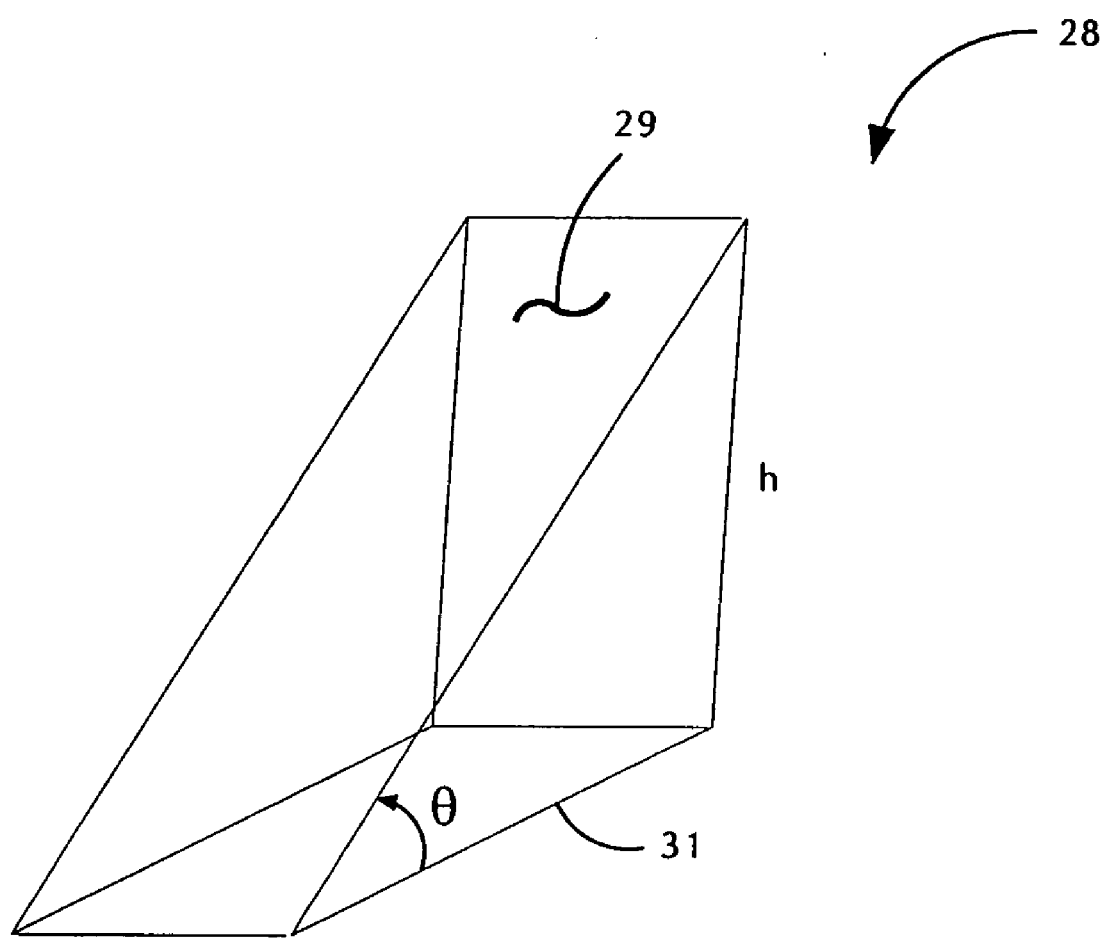
FIG. 3 is a perspective view of a compensation piece, such as that shown in FIG. 2, according to a preferred embodiment of the invention.

Turning to FIG. 3 for a moment, compensation piece or wedge 28 includes a sloped microprobe mounting surface 29 to which a bottom surface 17 of substrate 16 is coupled. Wedge 28 also includes a bottom surface 31 preferably coupled to mounting base 32. Notably, the height "h" of wedge 28 varies with either the dimension of its base/bottom surface 31 or its angle θ. Moreover, wedge 28 may comprise a lightweight plastic, and in any event, is preferably made of an insulation material.

Referring more particularly to FIG. 2, the principles of the stress compensation according to the present invention are shown. Again, it is difficult to control stress in the fabrication of the microprobe 10. Piezoelectric layer 26 may exert significant surface stress on microcantilever portion 18, bending it along the length of the microcantilever out of the plane of substrate 16 by several degrees. This unwanted stress is sufficient to deflect the microcantilever 18 out of the sensitive range of the deflection detector 35 as shown with the dashed line 38 in FIG. 2. More particularly, a laser beam 34 emitted by a laser diode 36 is reflected from the underside of the microcantilever 12. The sweep of such reflection 38 ideally is detected by a deflection detector 35, but the static deflection of the cantilever renders the reflected beam 38 undetectable without repositioning the deflection detection apparatus, and unwanted and sometimes completely impractical task. As the reflected beam 38 sweeps back and forth across the detector 35, it produces a signal having a frequency proportional to the oscillation frequency of the microcantilever 12 (in an oscillating mode, for instance), and a magnitude proportional to the extent of microcantilever bending. By selecting a wedge 28 with an appropriate angle $\theta$, the reflected beam is re-directed along a path marked 38 so that it may be detected by sensor 35.

Figure 4A:
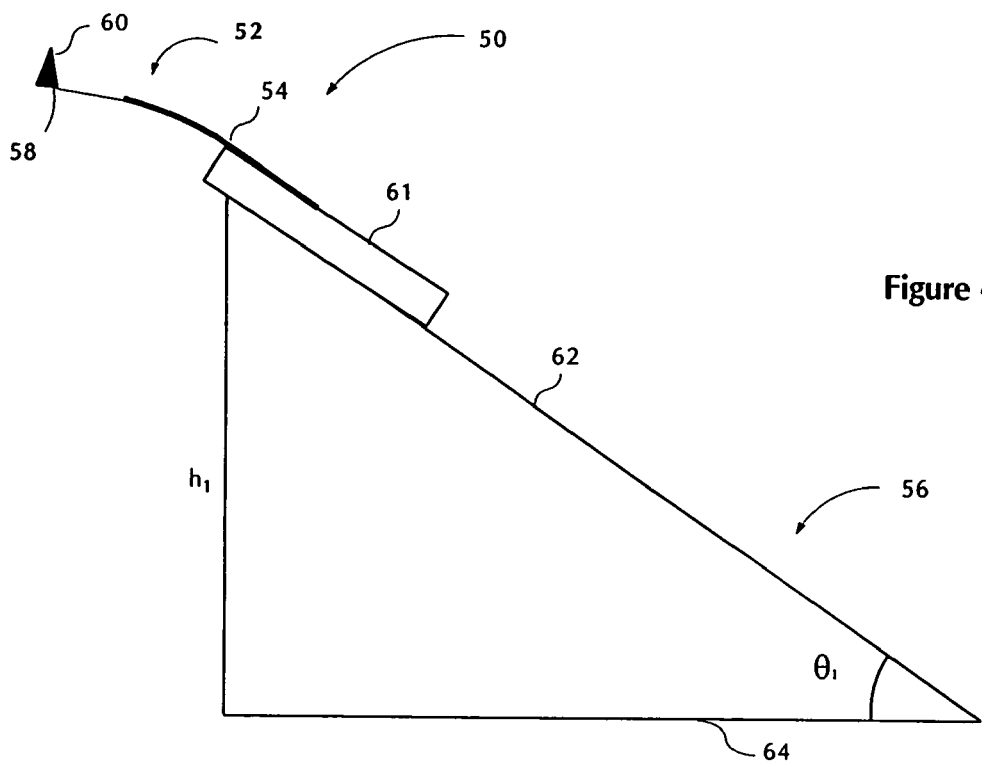
FIGS. 4A and 4B illustrate two combinations of microprobes and wedges having various dimensions selected based on a measured amount of stress-induced deflection of the corresponding microprobe.
Figure 4B:
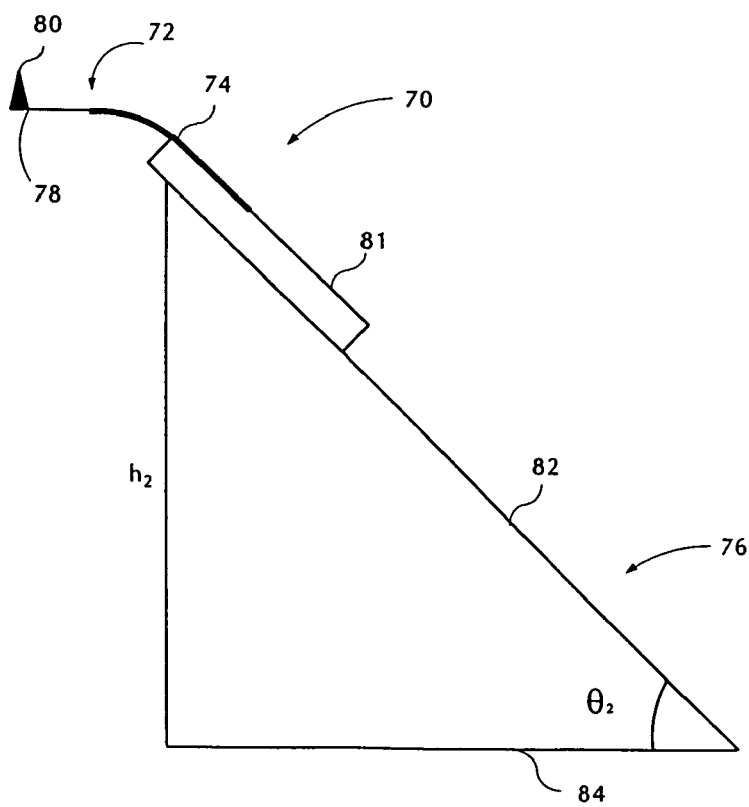

FIGS. 4A and 4B show microprobe 10 of FIG. 2, illustrating compound microprobes having different degrees of stress-induced deflection, and corresponding compensation pieces 56, 76. Each compensation piece preferably comprises a wedge that has a different angle "$\theta$" and a height "h" selected based on the factors discussed previously, namely the amount of static stress-induced deflection of the microprobe and the orientation of the AFM system components, for example. Generally, wedges 56, 76 are designed to compensate for a measured amount of stress deflection of the microcantilever (described below), by ensuring that the distal end of the force detection cantilever is in the proper position for reflecting the laser light so that it can be detected during a scanning operation. The amount of stress-induced bending along the length of the microcantilever is critical because the beam bounce detection relies on the microcantilever being at a predetermined angle for the reflected laser beam to fall within the usable or adjustable range of the photodetector, as best shown in FIG. 2 and described above. Notably, although compensation pieces 56, 76 are preferably wedge-shaped, the particular shape is dependent on the amount of stress-induced cantilever bending such that compensation piece could be a shim, for example.

Referring more particularly to FIGS. 4A and 4B, the angles and heights of the compensation pieces effect the position of the distal end of the microprobe with respect to the deflection detection system. Preferably, the distal end of the microprobe is placed at the focus of the laser beam, or close to the end of the fiber optic laser source (not shown). This is dependent on the length of the cantilever as well as the amount of static curve or bending caused during processing.

In FIG. 4A, compound microprobe 50 includes microcantilever portion 52 that is characterized as having a first amount of stress-induced deflection caused by, for example, a film 54. In this case, a wedge 56 is selected having a height $h_1$, and an angle $\theta_1$, such that, when probe 50 is coupled thereto, the distal end 58 including tip 60 of microprobe 50 is properly positioned vis-à-vis the deflection detection system (not shown). After selecting the appropriate wedge 56, a substrate 61 of probe 50 is coupled to sloped (inclined or declined, as appropriate) surface 62 of wedge 56, while a base 64 of wedge 56 is coupled to a mount (e.g., mount 32 in FIG. 2).

In FIG. 4B, where a microcantilever portion 72 of a microprobe 70 is deflected a greater amount than microcantilever 52 by a film 74 disposed thereon, a different compensation piece is required. In this case, a height $h_2$ and an angle $\theta_2$ are chosen to again position a distal end 78 of probe 70 so that it properly reflects the laser light within the range of the deflection detection system (33 in FIG. 2, for example). In particular, because microcantilever portion 72 is bent downwardly further than portion 52 in FIG. 4A (in this case, away from the sample, not shown) $\theta_2$ is greater than $\theta_1$. After selecting the appropriate wedge 76, a substrate 81 of probe 80 is coupled to sloped surface 82 of wedge 76, while a base 84 of wedge 76 is coupled to a mount (not shown). As a result, the distal end 78 will reflect the light within the range of the detector during an AFM scanning operation.

In the event that the microcantilever of the microprobe is bent upwardly (i.e., toward the sample that interacts with the tip, 60, 80 in FIGS. 4A and 4B), the wedge may have an angle of declination to accommodate the cantilever deflection in the direction of the tip. Generally, the angle is chosen to be smaller with less static deflection of the microprobe such that the angle of the light incident on the back, reflecting surface of the cantilever (for example, 78) is generally orthogonal thereto, thus keeping the reflected light within the detecting range of the sensor. Overall, an appropriate combination of wedge height and angle is chosen to insure that no matter the direction or the amount of stress-induced deflection, the corresponding deflection detection system will be able to monitor the interaction between the probe tip and one sample independent of system adjustment.

Figure 5:
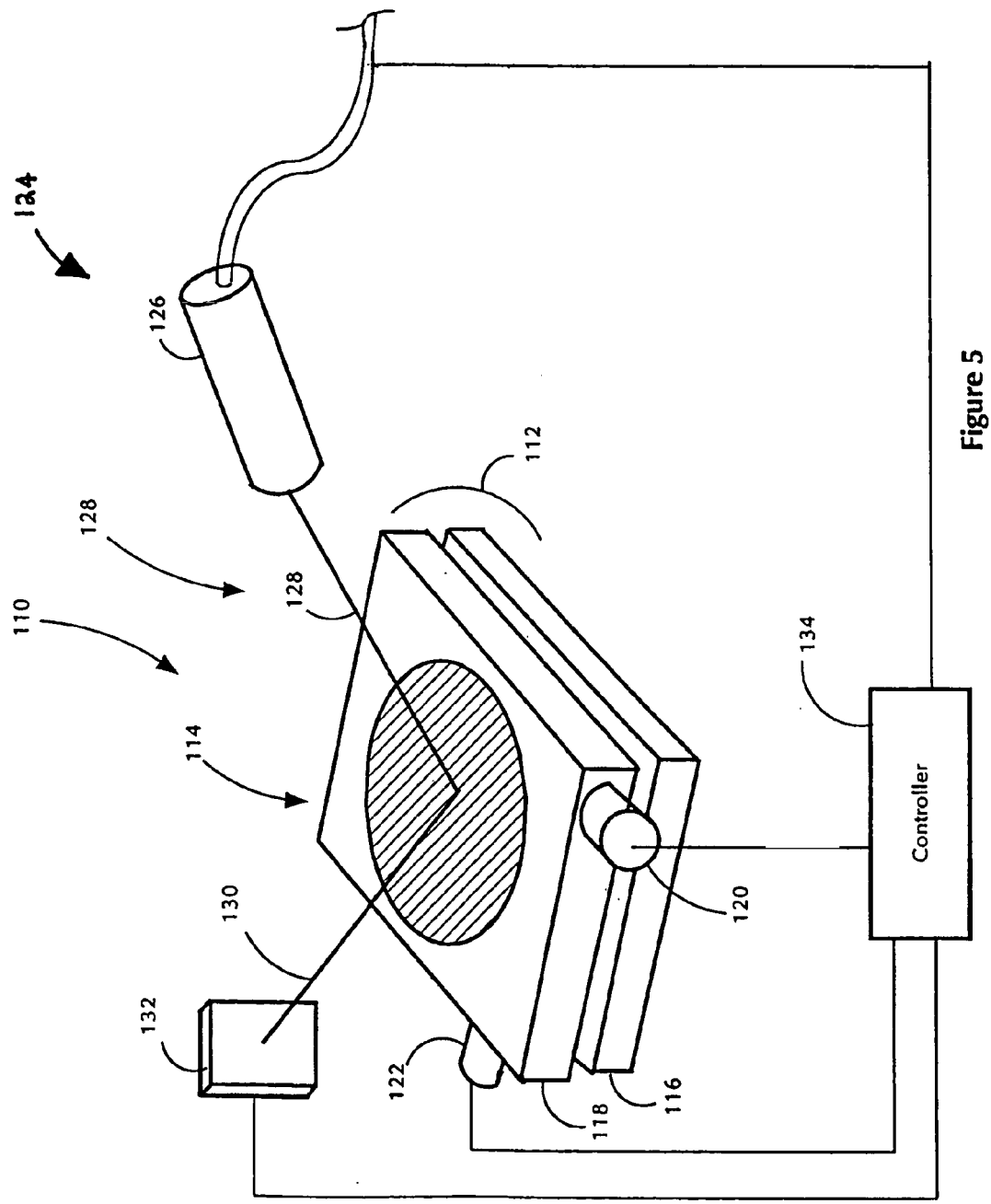
FIG. 5 is a perspective view of an AFM apparatus used to determine an amount of stress-induced static deflection of a microprobe, according to a preferred embodiment of the present invention.

FIG. 5 is a perspective view of an AFM apparatus 110 used to determine an amount of static stress-induced deflection of a plurality of microprobes, such as compound microprobe 10 shown in FIG. 1. Other methods of measurement will suffice for the purpose of this invention; however, this apparatus has superior throughput. A manufacturing lot of microprobes 10 is located atop an X-Y translating stage 112. For example, one lot of compound microprobes may comprise one wafer 114 from which an array of microprobes are fabricated according to known techniques.

When considering the microprobes of the wafer, it should be noted that the stress may vary from one microprobe to the next throughout the lot, in which case each probe must be individually measured. Similarly, the stress may vary according to locations on the wafer 114, such that microprobes within the same vicinity may be assumed to have the same degree of stress deflection. In another case, the deflection stress may be consistent for an entire wafer or lot of microprobes, or may be consistent for a batch of wafers processed concurrently or under identical conditions. Again, in the first case, it may be necessary to measure each individual microprobe. In the later cases it may suffice to measure microprobes only periodically and assume the stress deflection of the others based on a predictable occurrence of stress variation.

The X-Y translating stage 112 of FIG. 5 includes a fixed portion 116 and a movable portion 118. Movable portion 118 translates with respect to fixed portion 116 under control of a X translating actuator 120 and a Y translating actuator 122. X and Y translating actuators, 120 and 122, respectively, may be electric motors. Alternatively, the translation actuators may be hand cranks, or rotating knobs. Translating stage 112 may hold an arrangement of microprobes, for example, formed from a wafer 64, and is capable of positioning individual microprobes within a deflection detection system 124. Deflection detection system includes a laser diode 126 that directs a laser beam 128 at the microprobes under inspection at a fixed angle to the stage such that a reflected beam 130 is incident upon an indicator 132. The indicator 132 may simply be a graduated scale for an operator to observe the resulting angle of the laser beam. Alternatively, indicator 132 may be a linear or differential photodetector to convert the angle of the reflected beam 130 to an electrical signal, a signal indicative of the stress deflection of the microcantilever. Based on the measurements obtained by scanning the wafer 114 (implemented with a controller 134), the degree of deflection associated with each microprobe is stored for selecting an appropriate compensation piece (e.g., 56 in FIG. 4A) as described in further detail immediately below.

Figure 6:
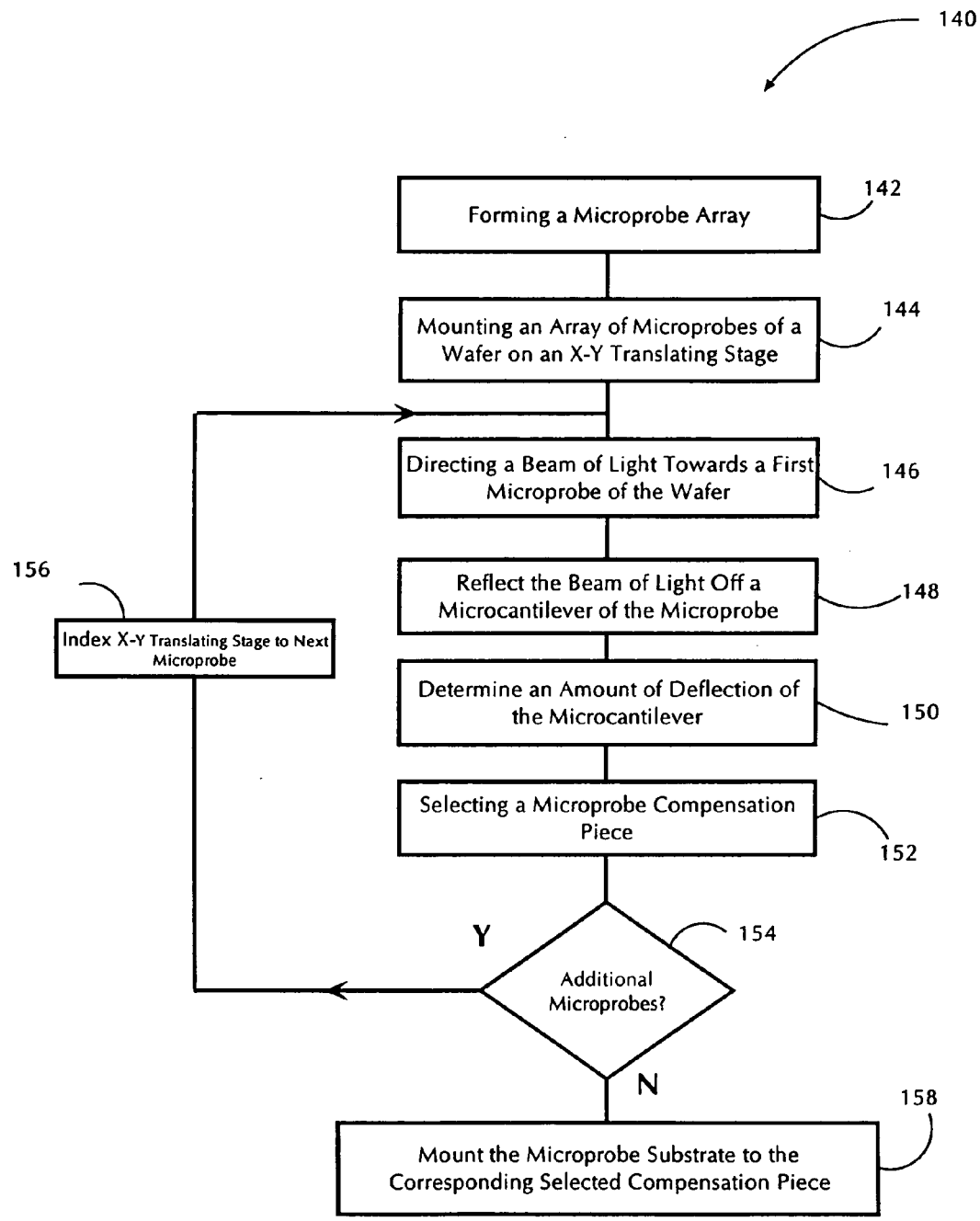
FIG. 6 is a flow chart illustrating the steps of a method of compensating for stress-induced deflection of a microprobe, according to a preferred embodiment of the present invention.

FIG. 6 shows a flow chart illustrating a method 140 for compensating stress induced deflection in piezoelectric microprobes. Note that the steps of method 140 are described in conjunction with the apparatus of FIG. 5, and references to the apparatus are included where appropriate. Initially, in Step 142 of process 140, an array of microprobes is formed in a silicon wafer. Typically, the microprobes are formed as a series of parallel rows of microprobes all attached at one end to the silicon wafer from which they are formed.

Next, in Step 144, the wafer, with its integral array of microprobes, is mounted on an X-Y translating stage such as that shown in FIG. 5. In Step 146, a beam of light from a laser (for example, 126 in FIG. 5) is directed towards a first microprobe of the wafer 114. This beam is reflected off a microcantilever of the first microprobe and directed towards a photodetector 132 in Step 148.

Then in Step 150, controller 134 measures the light falling on the photodetector 132 and determines the amount of deflection of the microprobe. In Step 152, a computer (not shown) can be used to compute the shape of an appropriate compensation piece (e.g., 56 in FIG. 4A) based on the amount of deflection previously calculated in Step 150.

In Step 154, method 140 determines whether there are any more microprobes in the microprobe array. If so, in Step 156, controller 134 indexes the X-Y translating stage 112 to the next microprobe position such that the beam of light from laser 126 can be reflected off the microcantilever of the next microprobe. In this case, method 140 returns to Step 146 and executes the successive steps described above. Alternatively, if there are no more microprobes to be measured, as determined in Step 154, processing continues in Step 158 wherein each of the microprobes is mounted to the selected microprobe compensation piece.

While the process described above is one that is preferably performed by a controller under programmed control, it may also performed manually, such as reading a light meter coupled to detector 132 and indexing the X-Y translating stage using knobs, switches or other manually operable controls.

Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept.

What is claimed is:

1. A compound microprobe assembly comprising:
   a microprobe mount;
   a microprobe coupled to said microprobe mount, the microprobe having an amount of static stress-induced deflection; and
   wherein said microprobe mount is configured so as to compensate for the amount of static deflection.

2. The microprobe assembly of claim 1, wherein said microprobe mount includes a support and a compensation piece having a shape corresponding to the amount of static deflection.

3. The microprobe assembly of claim 2, wherein the compensation piece is a wedge generally aligning the microprobe with a deflection detection apparatus.

4. The microprobe assembly of claim 2, wherein said support and said compensation piece are integrally formed.

5. A method to compensate for stress-induced deflection in a compound microprobe, the microprobe including a substrate, a microcantilever extending outwardly from the substrate, and a film formed on the microcantilever, said method comprising the steps of:
   determining an amount of stress-induced deflection of the microcantilever; and
   mounting the microprobe so as to compensate for the stress-induced deflection.

6. The method of claim 1, wherein said mounting step includes selecting a compensation piece based upon the amount of stress-induced deflection.

7. The method of claim 6, wherein the compensation piece is a wedge generally aligning the microcantilever with a deflection detection apparatus.

8. The method of claim 6, wherein said mounting step includes coupling a bottom surface of the substrate to the compensation piece.

9. The method of claim 6, wherein the stress-induced deflection is a static deflection caused by the film.

10. The method of claim 6, wherein said step of selecting the compensation piece comprises correcting an angle between a longitudinal axis of the microcantilever and the substrate so as to insure that light reflected from the microcantilever during operation contacts a detector of a deflection detection apparatus.

11. The method of claim 10, wherein said selecting step includes selecting a dimension of the compensation piece.

12. The method of claim 11, wherein the compensation piece is a wedge and the dimension is an angle between a microcantilever mounting surface of the wedge and a base of the wedge.

13. The method of claim 12, wherein said mounting step includes attaching substrate to the mounting surface.

14. A method of compensating an amount of static deflection associated with at least one microprobe of a first planar array of microprobes, each microprobe of the array including a substrate, a microcantilever extending outwardly from the substrate, and a film formed on the microcantilever, the method comprising the steps of:
   directing a beam of light towards a first microprobe of the first array of microprobes;
   reflecting the beam off the microcantilever of the first microprobe;
   determining a first amount of static deflection based on the reflected beam; and
   selecting a first microprobe compensation piece based upon the first amount of deflection.

15. The method of claim 14, further comprising the step of:
mounting each of the microprobes of the first planar array of microprobes on a compensation piece having the same shape as the first selected microprobe compensation piece.

16. The method of claim 14, further comprising the step of:
repeating said directing, reflecting, determining and selecting steps for each of the microprobes of the first array of microprobes;
and then mounting each of the microprobes on a corresponding compensation piece having a shape selected according to a corresponding amount of static deflection.

17. The method of claim 14, further comprising the step of mounting the first microprobe on the first selected microprobe compensation piece.

18. The method of claim 17, further comprising the step of:
integrally forming the first array of microprobes from a single wafer prior to the directing step.

19. The method of claim 14 further comprising the step of:
mounting each of a second planar array of microprobes on a corresponding compensation piece shaped according to the first selected microprobe compensation piece.

20. The method of claim 19, including the steps of:
integrally forming the first array of microprobes from a first wafer; and
integrally forming the second array from a second wafer.

21. The method of claim 14, wherein the first compensation piece is a wedge.

22. The method of claim 21, wherein the wedge includes a base and a mounting surface defining an angle.

23. The method of claim 22, wherein said selecting step includes computing the angle based on said determining step.

24. The method of claim 14, further comprising the steps of:
mounting the first array of microprobes on an X-Y translating stage configured to translate in a plane parallel to the first array prior to said directing step; and
removing the first array from the X-Y translating stage.

25. The method of claim 24, wherein the translating stage is motor-driven.

26. The method of claim 24, further comprising the step of:
translating the stage to a first position in which the first microprobe of the first array of microprobes is disposed in an optical path defined by the beam, wherein said translating step is performed prior to said directing step;
moving, after said selecting step, the stage to a second position in which a second microprobe of the first array of microprobes is disposed in the optical path;
reflecting the beam off a microcantilever of the second microprobe;
determining a second amount of deflection of the beam indicative of an amount of static deflection of the microcantilever of the second microprobe;
selecting a second microprobe compensation piece based upon the second amount of deflection; and
repeating said moving, directing, reflecting, determining and selecting steps for each microprobe of the first array of microprobes.

27. The method of claim 26, wherein the first and second compensation pieces are wedge-shaped.

28. The method of claim 27, wherein the compensation pieces each have a base and a mounting surface defining a corresponding angle.

29. The method of claim 28, wherein the corresponding angles of the compensation pieces are different.

30. The method of claim 28, wherein the compensation pieces are made of an insulating material.

* * * * *

UNITED STATES PATENT AND TRADEMARK OFFICE
CERTIFICATE OF CORRECTION

| | |
|---|---|
| PATENT NO. | : 6,941,823 B1 |
| APPLICATION NO. | : 10/045438 |
| DATED | : September 13, 2005 |
| INVENTOR(S) | : Jonathan W. Lai et al. |

It is certified that error appears in the above-identified patent and that said Letters Patent is hereby corrected as shown below:

IN THE CLAIMS

CLAIM 6, column 12, line 28, delete "1" and substitute therefor -- 5 --.

Signed and Sealed this

First Day of August, 2006

JON W. DUDAS
*Director of the United States Patent and Trademark Office*